US012636905B1

(12) United States Patent
Genoshe et al.

(10) Patent No.: US 12,636,905 B1
(45) Date of Patent: May 26, 2026

(54) ACCESSIBLE PAINT CONTAINER COVER

(71) Applicants: Christina Genoshe, Colorado Springs, CO (US); Brian Genoshe, Colorado Springs, CO (US)

(72) Inventors: Christina Genoshe, Colorado Springs, CO (US); Brian Genoshe, Colorado Springs, CO (US)

( * ) Notice: Subject to any disclaimer, the term of this patent is extended or adjusted under 35 U.S.C. 154(b) by 0 days.

(21) Appl. No.: 19/297,223

(22) Filed: Aug. 12, 2025

(51) Int. Cl.
*B44D 3/12* (2006.01)

(52) U.S. Cl.
CPC .................................... *B44D 3/127* (2013.01)

(58) Field of Classification Search
CPC ...................................................... B44D 3/127
See application file for complete search history.

(56) References Cited

U.S. PATENT DOCUMENTS 4,892,219 A * 1/1990 Smith ..................... B63B 43/16 29/402.09
5,016,774 A * 5/1991 Rodriguez ............. B44D 3/127 220/254.1
5,806,704 A * 9/1998 Jamison ................. B44D 3/125 220/795
5,881,633 A * 3/1999 Adams .................. A47J 36/064 99/422
7,162,766 B1 * 1/2007 Yakopcic ............... A63B 57/60 15/160
7,611,029 B2 * 11/2009 Wong ................... B65D 47/286 220/780
10,980,373 B2 * 4/2021 Cotto ...................... A47J 47/16
2004/0195238 A1 * 10/2004 Brija ....................... A47J 36/06 220/912
2011/0135222 A1 * 6/2011 Krueger ................. A47G 19/30 383/33
2014/0175104 A1 6/2014 Leonard et al.
2023/0089673 A1 * 3/2023 Wasche .................. B44D 3/127 220/309.2

OTHER PUBLICATIONS https://www.painterssolutions.com/products/90217736?variant=22933820178496&country=US&currency=USD&utm_medium=product_sync&utm_source=google&utm_content=sag_organic&utm_campaign=sag_organic&srsltid=AfmBOoq-G9jsEgVrVtPyeCrlRb_BBRLsu_rpsi91xLI6qSv6E6zQGjkJo-c&gQT=1.

* cited by examiner

*Primary Examiner* — James N Smalley
(74) *Attorney, Agent, or Firm* — Fargo Patent & Business Law; Thomas Kading

(57) ABSTRACT

A paint container cover assembly configured to accommodate a paint sprayer pump while protecting the contents of the container. The assembly includes a paint container cover having an opening that extends through an edge of the cover and a flexible seal removably retained within the opening. The flexible seal is configured to conform around the pump to inhibit the ingress of contaminants and minimize paint drying. In some embodiments, the seal comprises opposing flaps with comb-like teeth or pleats to enhance sealing. A clip may also be provided on the cover to retain and stabilize the pump during use. The assembly facilitates cleaner, more efficient paint spraying while maintaining the integrity of the paint within the container.

10 Claims, 5 Drawing Sheets

FIG. 2
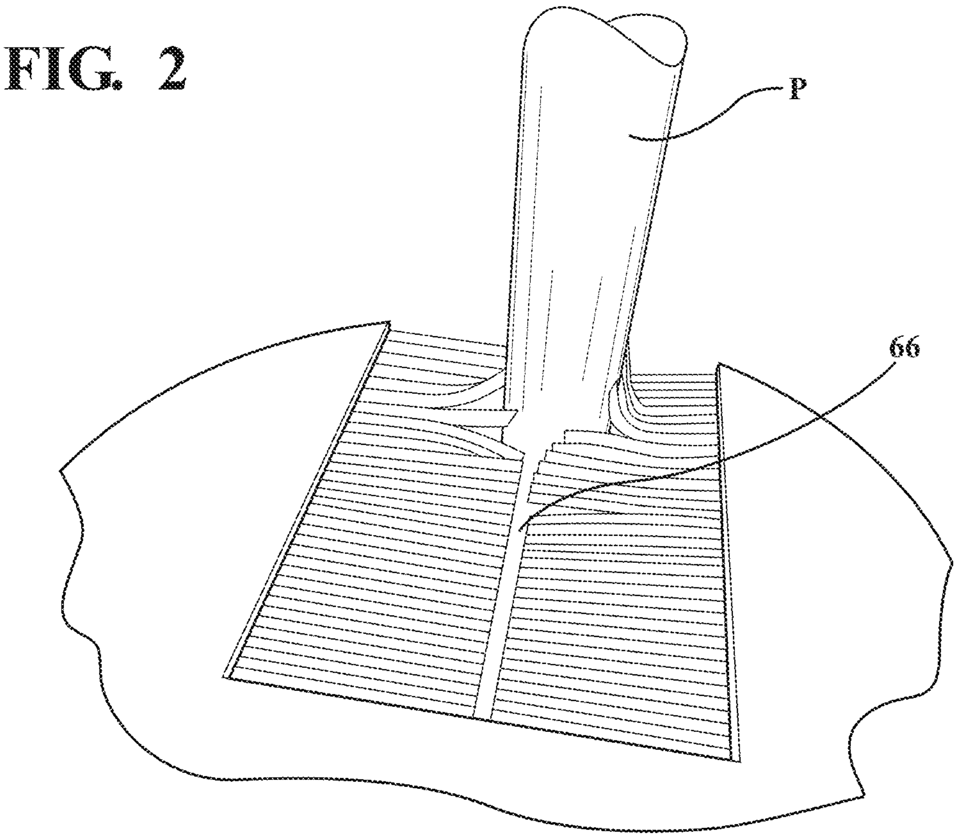
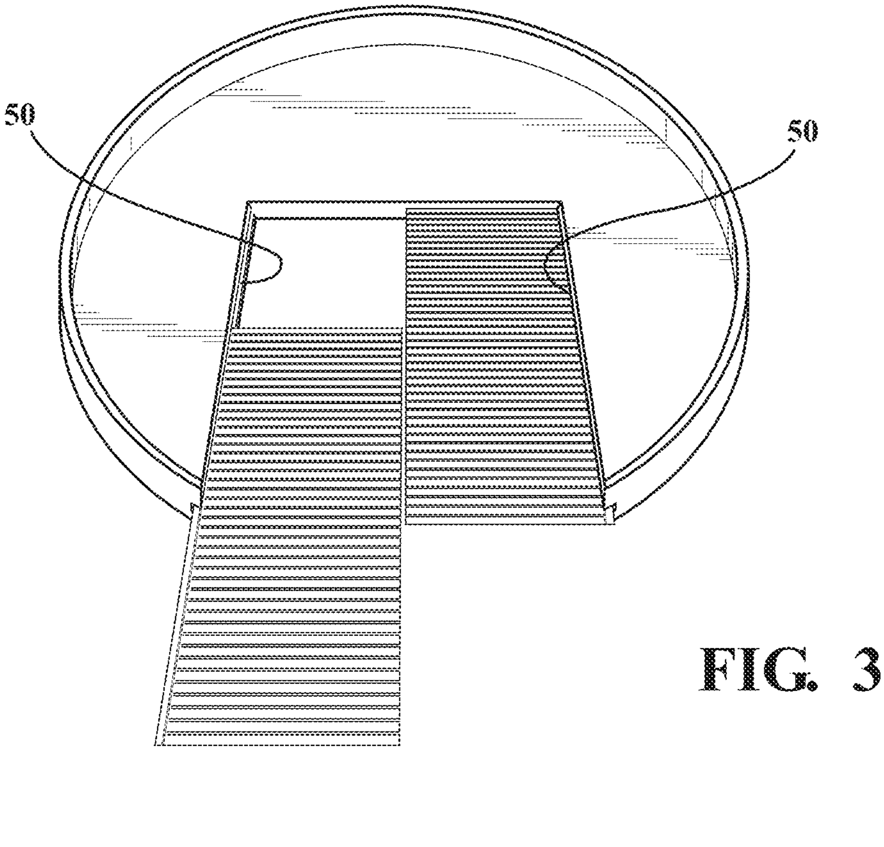
FIG. 3

FIG. 4
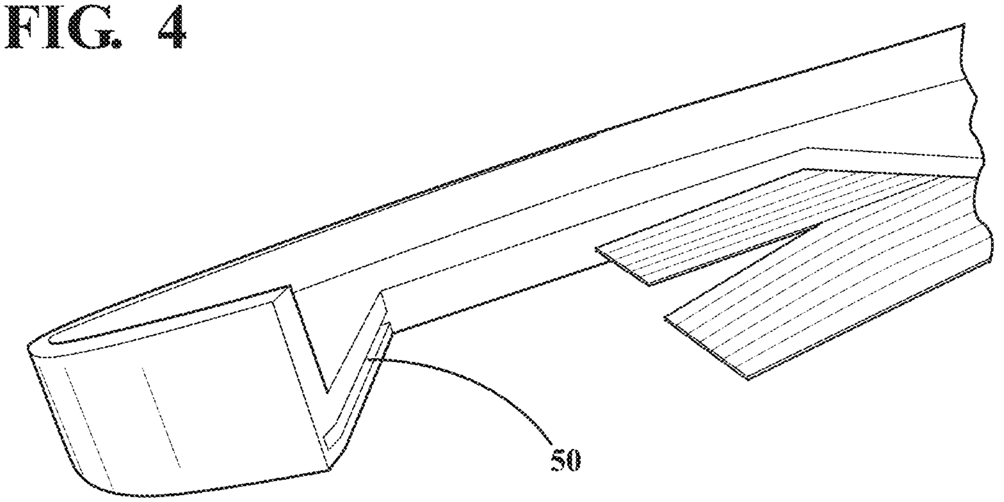
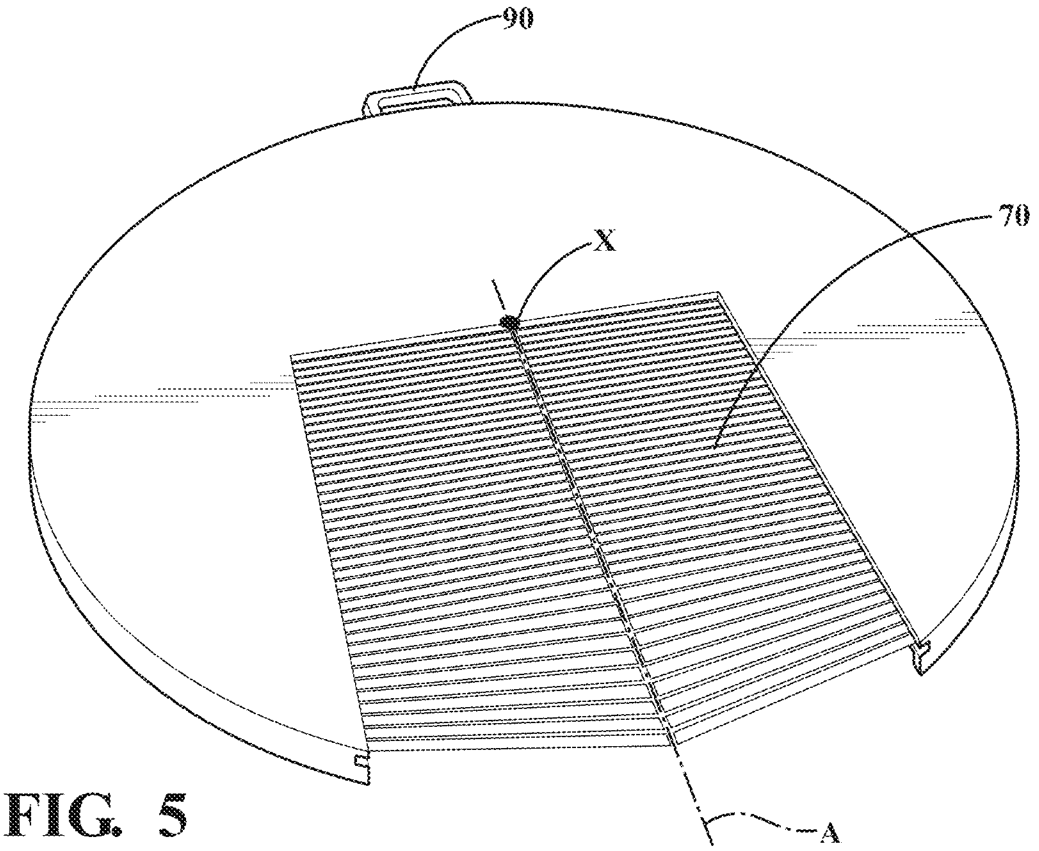
FIG. 5

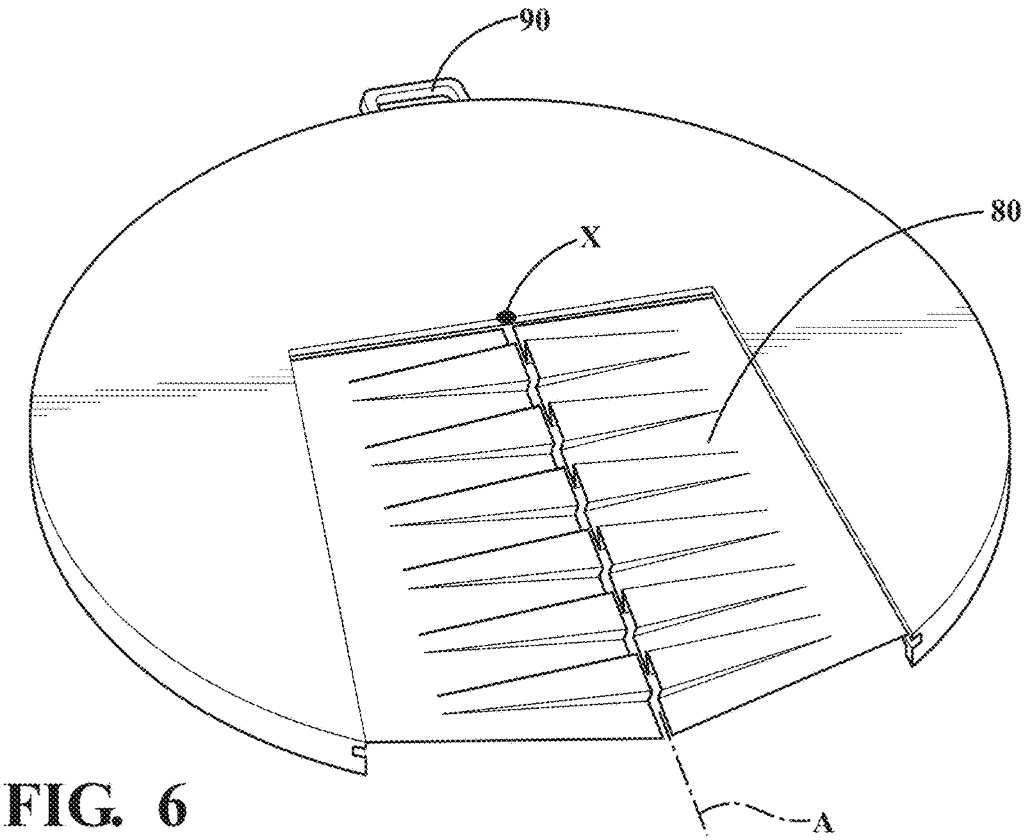
FIG. 6
FIG. 7
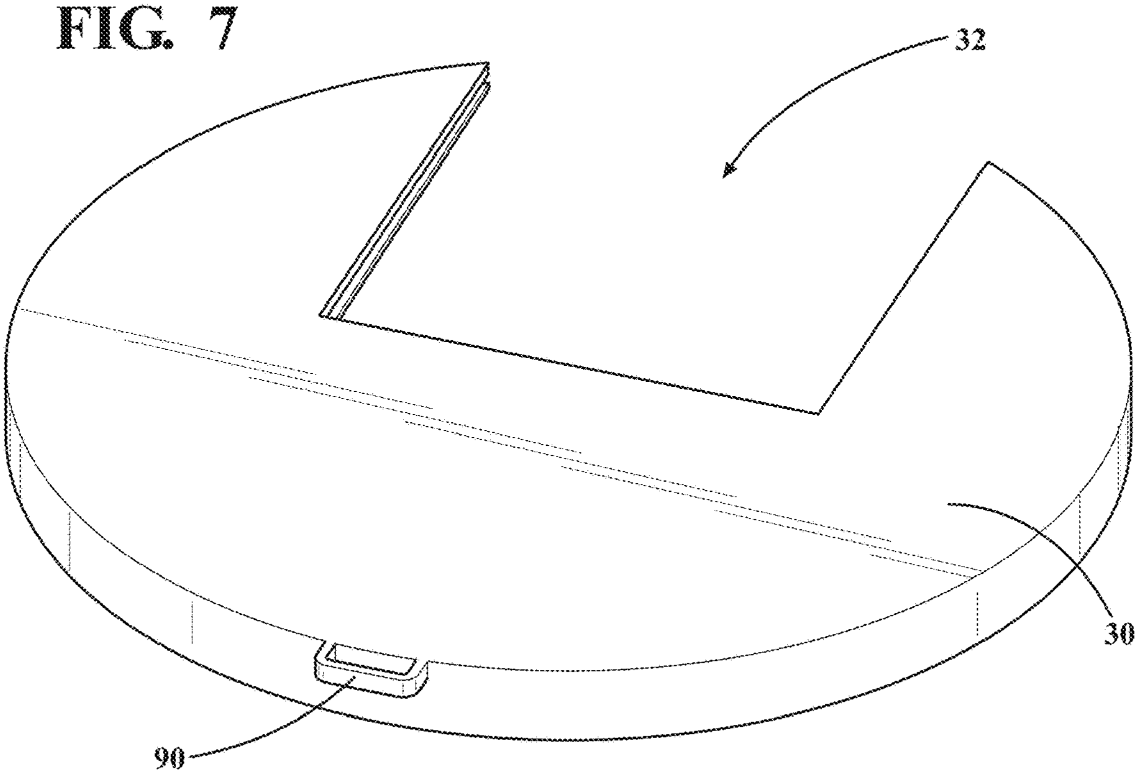

ACCESSIBLE PAINT CONTAINER COVER

CROSS REFERENCE TO RELATED APPLICATION[S]

None

BACKGROUND

The present disclosure relates to a paint container cover, and more specifically to a cover that provides access for a paint sprayer pump.

Paint sprayers require insertion of a paint pump into a conventional 1- or 5-gallon paint container. The cover thereof is removed for insertion of paint sprayer pump such that the paint remains uncovered. Without the cover, the paint may then be subject to debris and other contaminants as well as increases the paint drying from exposure to the air.

Some painters wrap the paint sprayer pump in a thin sheet of plastic and then tape the plastic to the container. This may be messy, time consuming, wasteful, and unreliable.

This background section is intended to introduce the reader to various aspects of art that may be related to various aspects of the present disclosure, which are described and/or claimed below. This discussion is believed to assist the reader with background information to facilitate a better understanding of the various aspects of the present disclosure. Accordingly, it should be understood that these statements are to be read in this light, and not as admissions of prior art.

SUMMARY

A paint container cover according to one disclosed non-limiting embodiment of the present disclosure includes a cover with an edge opening and a flexible seal held within that opening.

A further embodiment of any of the foregoing embodiments of the present disclosure includes, wherein the cover is circular.

A further embodiment of any of the foregoing embodiments of the present disclosure includes, wherein the opening is at least partially rectilinear.

A further embodiment of any of the foregoing embodiments of the present disclosure includes, wherein the flexible seal is designed to slide into the opening.

A further embodiment of any of the foregoing embodiments of the present disclosure includes, wherein the seal is removably held in place by an interface.

A further embodiment of any of the foregoing embodiments of the present disclosure includes, wherein the interface may be a dovetail connection.

A further embodiment of any of the foregoing embodiments of the present disclosure includes, wherein the interface may be a hook-and-loop connection.

A further embodiment of any of the foregoing embodiments of the present disclosure includes, wherein the flexible seal includes a first and a second flap.

A further embodiment of any of the foregoing embodiments of the present disclosure includes, wherein each flap has a multiple of comb-like teeth.

A further embodiment of any of the foregoing embodiments of the present disclosure includes, wherein each flap may be pleated.

A further embodiment of any of the foregoing embodiments of the present disclosure includes, wherein each flap may be flat.

A further embodiment of any of the foregoing embodiments of the present disclosure includes, wherein the flexible seal is made from silicone material.

A further embodiment of any of the foregoing embodiments of the present disclosure includes, wherein the paint container cover includes a lip that does not interfere or snap onto the paint container.

A further embodiment of any of the foregoing embodiments of the present disclosure includes, wherein the paint container cover includes a clip configured to retain a portion of the paint sprayer pump during use.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 2 is a schematic view of a paint container cover assembly with a paint sprayer pump.

FIG. 3 is another schematic view of a paint container cover assembly.

FIG. 4 is an edge view of the paint container cover assembly.

FIG. 5 is a schematic view of a comb-like flexible seal of the paint container cover assembly according to a disclosed non-limiting embodiment.

FIG. 6 is a schematic view of a pleated flexible seal of the paint container cover assembly according to a disclosed non-limiting embodiment.

FIG. 7 is another schematic view of a paint container cover assembly.

DETAILED DESCRIPTION

Figure 1:
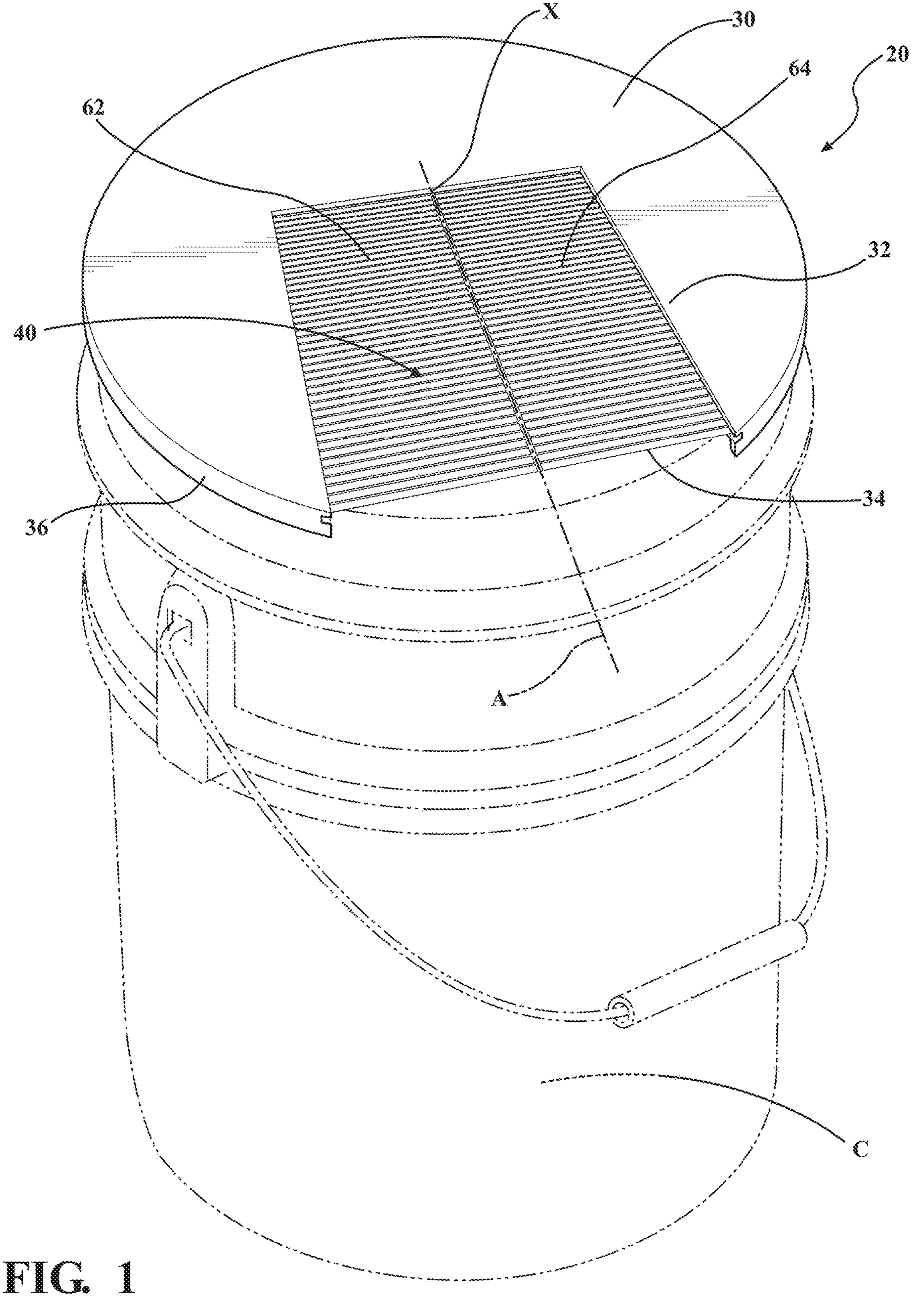
FIG. 1 is a schematic view of a paint container cover assembly according to one disclosed non-limiting embodiment.
Figure 8:
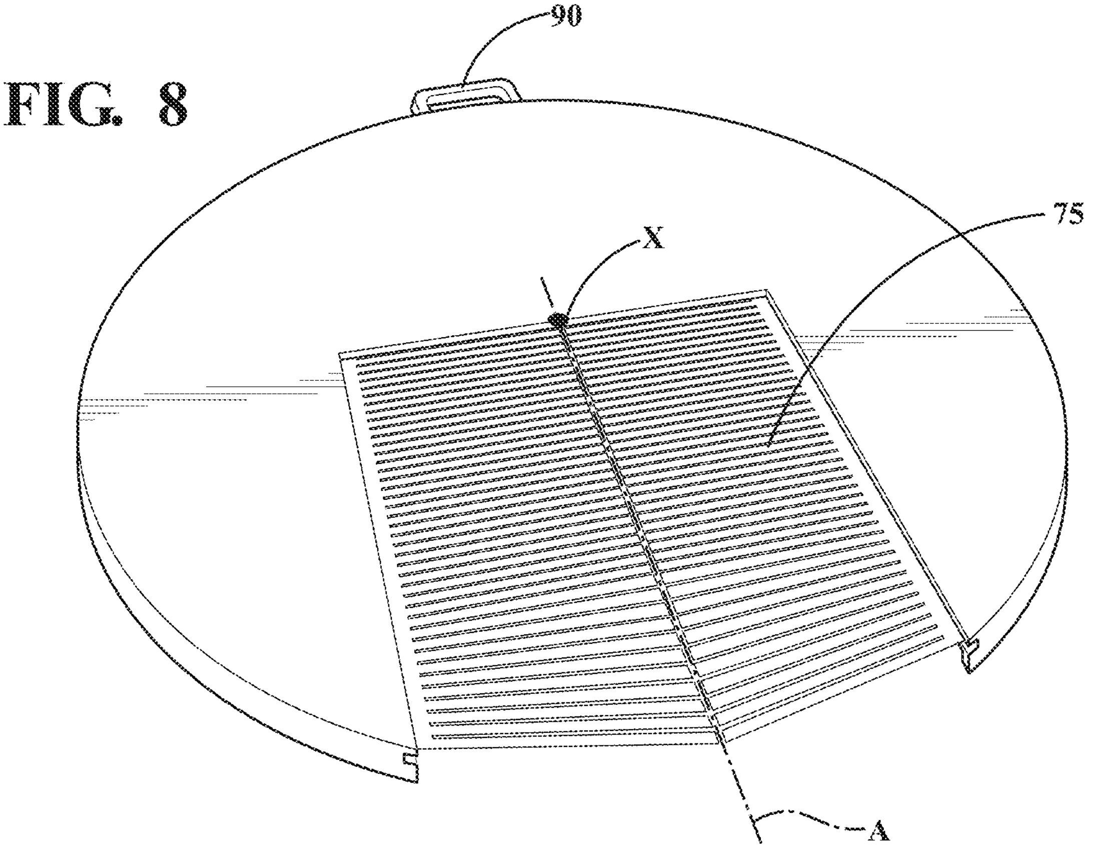
FIG. 8 is another schematic view of a comb-like flexible seal of the paint container cover assembly according to a disclosed non-limiting embodiment.

FIG. 1 schematically illustrates a paint container cover assembly 20 that includes a paint container cover 30 with an opening 32 that extends through an edge 34 thereof and a flexible seal 40 that fits within the opening 32 an allows insertion of a paint sprayer pump P therethrough (FIG. 2). The flexible seal 40 is configured to interface and provide a conformal seal with the paint sprayer pump P so as to protect the paint during the spraying process yet facilitates convenient removal and insertion of the paint sprayer pump P.

The paint container cover 30 may include a lip 36 along the edge 34 for attachment to a paint container C, for example, a cylindrical 1 or 5-gallon paint container, having a size and shape corresponding to the cover 30. In one embodiment, the paint container cover 30 rests upon the paint container C to cover the opening and the lip 36 extends around the periphery of the container C but need not snap thereon. That is, in embodiments, the lip 36 does not provide an interference fit so that the paint container cover 30 may just rest upon the paint container C so as to be removed and replaced with minimal effort.

In one embodiment, the opening 32 may be rectilinear in shape within the paint container cover 30 which may be circular. As the opening 32 extends through the edge 34, the opening 32 is readily accessible. For example, the flexible seal may be slid into the opening 32 and retained therein via an interface 50 (FIG. 3) such as a dovetail interface, hook and loop interface, etc. The interface 50 facilitates removal and replacement of the flexible seal 40. In embodiments, the interface 50 may be essentially disposable.

The flexible seal 40 may be manufactured of a flexible material such as a silicone material to minimize paint sticking and to facilitate cleaning. In embodiments, the flexible seal 40 and be formed as a first flap 62 and a second flap 64. The flaps 62, 64 may provide an interface 66 that is generally arranged along an axis A that intersects with a center X of the paint container cover 30.

Figure 9:
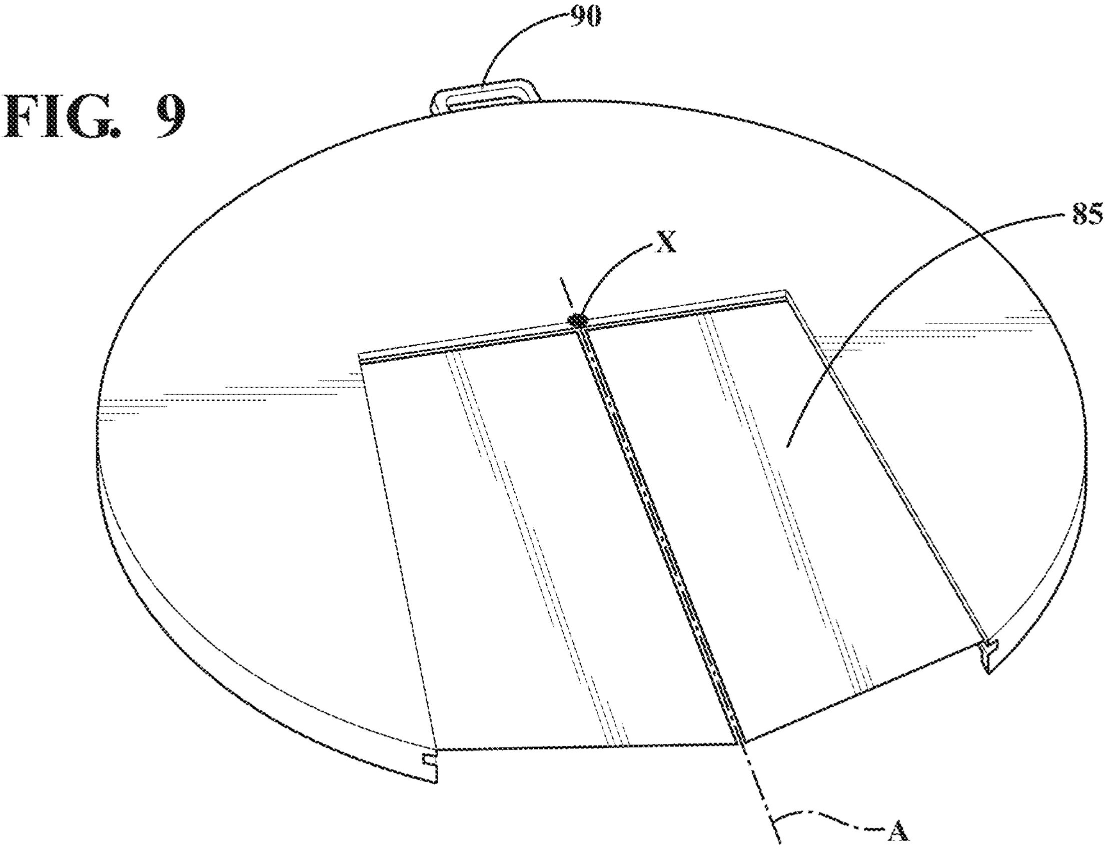
FIG. 9 is a schematic view of a flat flexible seal of the paint container cover assembly according to a disclosed non-limiting embodiment.

In embodiments, the flaps 62, 64 may further include a multiple of comb-like teeth (FIG. 5) transverse to the axis A to facilitate formation of the conformal seal to better form around the cylindrical paint sprayer pump P. In other embodiments, the flaps 62, 64 may include a multiple of pleats 80 (FIG. 5) to seal with the cylindrical paint sprayer pump P. In other embodiments, the flaps 62, 64 may be flat (FIG. 9) to seal with the cylindrical paint sprayer pump P. Other seal constructions may alternatively of additionally be provided.

In embodiments, the paint container cover C may include a clip 90, which is configured to retain and stabilize the paint sprayer pump P during use. The clip 90 may be integrally formed with or affixed to the outer surface of the paint container cover 30 and extends upward or laterally from the cover's perimeter. The clip 90 may include a resilient or semi-rigid body with a hooked or notched portion that securely engages a portion of the paint sprayer pump P, such as its handle, housing, or mounting feature, to inhibit lateral or vertical movement. This engagement assists in maintaining the position of the pump relative to the flexible seal 40 and opening 32, thereby preventing dislodgement during operation and minimizing disruption to the seal interface.

The paint container cover assembly 20 is effective to lock in moisture and prevent contaminants from entering the paint, is user friendly, easy to clean and eco-friendly.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. A paint container cover assembly, comprising:
- a paint container cover that comprises an opening that extends through an edge thereof; and
- a flexible seal removably retained within the opening, wherein the flexible seal comprises a first and a second flap, the first and the second flap each comprise a multiple of comb-like teeth.

2. The assembly as recited in claim 1, wherein the first and the second flap are each pleated.

3. The assembly as recited in claim 1, wherein the first and the second flap are each flat.

4. The assembly as recited in claim 1, wherein the flexible seal is manufactured of a silicone material.

5. The assembly as recited in claim 1, wherein the paint container cover comprises a lip that does not interfere with the paint container.

6. The assembly as recited in claim 1, further comprising a clip connected to the paint container cover and configured to retain a portion of a paint sprayer pump in position during use.

7. The assembly as recited in claim 1, further comprising a clip configured to interface with a paint sprayer pump.

8. The assembly as recited in claim 7, wherein the clip may be integrally formed to the paint container cover.

9. The assembly as recited in claim 8, wherein the clip extends laterally from a perimeter of the paint container cover.

10. The assembly as recited in claim 9, wherein the clip is opposite the opening.

* * * * *